United States Patent
Yang et al.

(10) Patent No.: US 11,359,999 B2
(45) Date of Patent: Jun. 14, 2022

(54) EXPERIMENTAL PLATFORM AND EXPERIMENTAL METHOD FOR SIMULATING COAL ROCK DISASTER OF COAL MINE STOPE

(71) Applicant: China University of Mining and Technology, Beijing, Beijing (CN)

(72) Inventors: Shengli Yang, Beijing (CN); Jiachen Wang, Beijing (CN); Hao Yue, Beijing (CN); Fengqi Liu, Beijing (CN); Yanyao Ma, Beijing (CN); Junjie Wang, Beijing (CN)

(73) Assignee: China University of Mining and Technology, Beijing, Beijing (CN)

( * ) Notice: Subject to any disclaimer, the term of this patent is extended or adjusted under 35 U.S.C. 154(b) by 225 days.

(21) Appl. No.: 16/666,755

(22) Filed: Oct. 29, 2019

(65) Prior Publication Data
US 2020/0292419 A1    Sep. 17, 2020

(30) Foreign Application Priority Data

Mar. 11, 2019   (CN) .......................... 201910179446.8

(51) Int. Cl.
| | | |
|---|---|---|
| *G01M 99/00* | (2011.01) | |
| *G01M 17/00* | (2006.01) | |

(Continued)

(52) U.S. Cl.
CPC .............. *G01M 99/00* (2013.01); *G01M 7/08* (2013.01); *G01M 17/00* (2013.01); *G05B 17/02* (2013.01); *E99Z 99/00* (2019.05)

(58) Field of Classification Search
CPC ........ G01M 99/00; G01M 7/08; G01M 17/00; G05B 17/02; E99Z 99/00
See application file for complete search history.

(56) References Cited

U.S. PATENT DOCUMENTS

2018/0335374 A1 * 11/2018  Kanj ................... G01N 15/0826
2019/0113425 A1 *  4/2019  Kilali ....................... G01N 3/08
(Continued)

FOREIGN PATENT DOCUMENTS

| CN | 102261972 B | * | 5/2013 |
| CN | 204101517 U | * | 1/2015 |
| CN | 104458418 B | * | 6/2017 |

OTHER PUBLICATIONS

CN-102261972-B, Espacenet English Translation, downloaded from the Internet Jul. 24, 2020 (Year: 2011) (Year: 2011).*

(Continued)

*Primary Examiner* — Alexander Satanovsky
*Assistant Examiner* — Lyudmila Zaykova-Feldman
(74) *Attorney, Agent, or Firm* — Troutman Pepper Hamilton Sanders LLP; Christopher C. Close, Jr.

(57) ABSTRACT

The present invention provides an experimental platform for simulating a coal rock disaster of a coal mine extraction, including a base device, a coal simulation device, an immediate roof simulation device, a hydraulic support and a removable impact device. The coal simulation device is fixedly disposed on the base device; the hydraulic support is fixed on the base device and is located at one side of the coal simulation device; the immediate roof simulation device is disposed above the coal simulation device and the hydraulic support; the removable impact device is disposed above the immediate roof simulation device; the immediate roof simulation device is a rectangular frame; the rectangular frame is configured to pave a bulk simulation material and an immediate roof simulation material sequentially from the bottom up; and the removable impact device can impact the immediate roof simulation material and the bulk simulation material.

14 Claims, 4 Drawing Sheets

(51) Int. Cl.
*G05B 17/02* (2006.01)
*G01M 7/08* (2006.01)
*E99Z 99/00* (2006.01)

(56) References Cited

U.S. PATENT DOCUMENTS

2019/0323307 A1* 10/2019 George .................. E21B 33/134
2019/0331571 A1* 10/2019 Marchese .............. G01N 3/066

OTHER PUBLICATIONS

CN-204101517-U, Espacenet English Translation, downloaded from the Internet Jul. 24, 2020 (Year: 2014) (Year: 2014).*
CN-104458418-B, Espacenet English Translation, downloaded from the Internet Jul. 24, 2020 (Year: 2014) (Year: 2014).*

* cited by examiner

EXPERIMENTAL PLATFORM AND EXPERIMENTAL METHOD FOR SIMULATING COAL ROCK DISASTER OF COAL MINE STOPE

TECHNICAL FIELD

The present invention relates to the technical field of coal mine engineering, and in particular to an experimental platform and experimental method for simulating a coal rock disaster of a coal mine extraction.

BACKGROUND

A roof accident of a coal mine is one of five coal mine disasters, and has a great hazard to safety production of the mine. According to a statistic of coal mine accidents, most roof accidents occur on a extraction working surface and take up about 75-85%. The roof accidents on the extraction working surface often occur in a roof weighting period and are 60-70% approximately in the roof accidents. It can be seen from the above data that the roof weighting in the extraction has a crucial effect to the roof accident in the extraction, and a key for the roof weighting lies in rupture of a basic roof and a relationship with an immediate roof. Meanwhile, a part of loose top-coal or a broken immediate roof often exists on a fully-mechanized working surface in coal mine exploitation, which has a buffer effect to the roof weighting of the working surface. However, no mature experimental device can accurately simulate an influence of the loose top-coal or the broken immediate roof to the working surface. Therefore, there is an urgent need to design an experimental platform and experimental method for simulating a coal rock disaster of a coal mine extraction.

SUMMARY

An objective of the present invention is to provide an experimental platform and experimental method for simulating a coal rock disaster of a coal mine extraction, to solve the above-mentioned problems in the prior art, enable a bulk simulation material and an immediate roof simulation material paved in a rectangular frame sequentially to provide a buffer effect for roof weighting of a working surface, and accurately simulate an influence condition of loose top-coal or a broken immediate roof at different rupture positions and different impact loads to a hydraulic support and a coal wall in a removable impact process.

To achieve the above purpose, the present invention provides the following solution.

The present invention provides an experimental platform for simulating a coal rock disaster of a coal mine extraction, which includes a base device, a coal simulation device, an immediate roof simulation device, a hydraulic support and a removable impact device; the coal simulation device is fixedly disposed on the base device; the coal simulation device is configured to place a coal simulation material; the hydraulic support is fixed on the base device and is located at one side of the coal simulation device; the immediate roof simulation device is disposed above the coal simulation device and the hydraulic support; the removable impact device is disposed above the immediate roof simulation device; the immediate roof simulation device is a rectangular frame; the rectangular frame is configured to pave a bulk simulation material and an immediate roof simulation material sequentially from the bottom up; and the removable impact device can impact the immediate roof simulation material and the bulk simulation material.

Further, the base device includes a carrying platform and a pedestal; a slope adjusting jack is disposed between the carrying platform and the pedestal; a housing of the slope adjusting jack is fixedly connected to the carrying platform; and a push rod of the slope adjusting jack is fixedly connected to the pedestal.

Further, both the carrying platform and the pedestal are made of a plate material; a connecting hole is respectively formed at four edges of the carrying platform and the pedestal; and the carrying platform is detachably connected to the pedestal via the connecting hole and by using a connecting rod.

Further, the coal simulation device includes a lateral baffle plate, a front baffle plate, a rear baffle plate and an enclosed pressure application device; the lateral baffle plate, the front baffle plate and the rear baffle plate are disposed on the pedestal; a plurality of first grooves are formed on the pedestal; a plurality of first bumps are disposed on a bottom end of the lateral baffle plate; the lateral baffle plate is slidably connected to the pedestal via the first bumps and the first grooves; a plurality of second grooves are formed on a rear end of the lateral baffle plate; a plurality of second bumps are disposed on the rear baffle plate; the rear baffle plate is slidably connected to the lateral baffle plate via the second bumps and the second grooves; a front end of the lateral baffle plate is detachably connected to the front baffle plate; and the enclosed pressure application device provides an enclosed pressure for the lateral baffle plate and the rear baffle plate.

Further, the enclosed pressure application device includes a lateral carrying shaft, a pump station and a plurality of hydraulic cylinders; the lateral carrying shaft is fixed on the pedestal; cylinder bodies of the hydraulic cylinders are fixed on the lateral carrying shaft; push rods of the hydraulic cylinders can contact with the lateral baffle plate and the rear baffle plate respectively; and the hydraulic cylinders communicates with the pump station.

Further, the hydraulic support includes a top beam, a shield beam, a tail beam, a guard plate and a lateral protective plate; the top beam and the shield beam are made of a steel plate; an included angle between the top beam and the shield beam is 60°; the tail beam is hinged with the shield beam; a rear end of the top beam is hinged with the guard plate; one side, adjacent to the guard plate, of the top beam is hinged with the lateral protective plate; the guard plate can be attached to the coal simulation material when being opened; and the top beam, the guard plate and the lateral protective plate is respectively provided with a stress sensor.

Further, the removable impact device includes a support rod, a track and an electric-lifting electromagnetic absorption device; two support rods are provided; bottom ends of the two support rods are fixed on the pedestal; the track is crossly fixed on top ends of the two support rods; an upper end of the electric-lifting electromagnetic absorption device is slidably connected to the track; a lower end of the electric-lifting electromagnetic absorption device is fixedly connected to an iron plate; and the iron plate can impact the immediate roof simulation material and the bulk simulation material.

Further, the top ends of the support rods are of a U-shaped structure respectively; the track is welded in the U-shaped structures of the support rods; a top end of the lateral carrying shaft is welded on the track; and the rectangular frame is welded on the lateral carrying shaft.

Further, at least two electric-lifting electromagnetic absorption devices are provided and are controlled respectively and independently; the electric-lifting electromagnetic absorption device includes a steel slide plate, an electric lifting shaft and a sucking disc type electromagnet; the steel slide plate is slidably connected to the track; a plurality of idler wheels are disposed on the steel slide plate; the idler wheels are moved on the track; one end of the electric lifting shaft is fixedly connected to the steel slide plate, and the other end of the electric lifting shaft is connected to the sucking disc type electromagnet; and sucking disc type electromagnet can absorb or release the iron plate.

The present invention provides an experimental method for simulating a coal rock disaster of a coal mine extraction, which uses the above experimental platform for simulating a coal rock disaster of a coal mine extraction and includes the following steps:

1) preparing a coal simulation material according to a proportion of sand, lime and gypsum materials in coal in a coal simulation device;

2) uniformly arranging a plurality of strain gauges and displacement sensors at a side, close to a lateral baffle plate and a rear baffle plate, in the coal simulation material, and placing a pressure box below the coal simulation material;

3) paving a bulk simulation material in a rectangular frame to simulate loose top-coal or a broken immediate roof;

4) paving an immediate roof simulation material on the bulk simulation material;

5) respectively absorbing a central axis position of an iron plate by using two electric-lifting electromagnetic absorption devices;

6) powering off a sucking disc type electromagnet, so that two iron plates are thrown down to impact the coal simulation material, thus simulating rupture or an impact ground pressure of a basic roof;

7) recording a change of a stress on a top beam, a lateral protective plate and a guard plate, as well as a coal-wall displacement and a broken condition;

8) changing a bulk fragment dimension, a fragment dimension grading and a paving thickness of the bulk simulation material, and repeating the steps 4-7; and 9) changing a horizontal position, a height, a counterweight and an inclination angle of the iron plate as well as an inclination angle of a pedestal, and repeating the steps 5-8.

Compared with the prior art, the present invention achieves the following technical effects:

In the present invention, an immediate roof simulation device is arranged into a rectangular frame, a bulk simulation material and an immediate roof simulation material are paved in the rectangular frame sequentially from the bottom up and are configured to simulate a condition having loose top-coal or a broken immediate roof, a removable impact device is used to impact a coal simulation material and a hydraulic support in a coal simulation device, the bulk simulation material and the immediate roof simulation material respectively take a buffer effect above the hydraulic support and the coal simulation material in an impact process, and the removable impact device may be used to change an impact position and an impact load; and thus, a stress change condition of the hydraulic support and a coal wall are accurately simulated under different conditions.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

In the figure: 1—pedestal, 2—slope adjusting jack, 3—carrying platform, 4—lateral baffle plate, 5—rear baffle plate, 6—hydraulic cylinder, 7—lateral carrying shaft, 8—pump station, 9—rectangular frame, 10—hydraulic support, 11—top beam, 12—guard plate, 13—lateral protective plate, 14—shield beam, 15—tail beam, 16—track, 17—electric-lifting electromagnetic absorption device, 18—iron plate, 19—support rod, 20—electric lifting shaft, 21—sucking disc type electromagnet, 22—steel slide plate, 23—connecting hole, 24—first groove, 25—first bump, 26—second groove, and 27—second bump.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the disclosure without creative efforts shall fall within the protection scope of the disclosure.

An objective of the present invention is to provide an experimental platform and experimental method for simulating a coal rock disaster of a coal mine extraction, to solve the above-mentioned problems in the prior art, enable a bulk simulation material and an immediate roof simulation material paved in a rectangular frame sequentially to provide a buffer effect for roof weighting of a working surface, and accurately simulate an influence condition of loose top-coal or a broken immediate roof at different rupture positions and different impact loads to a hydraulic support and a coal wall in a removable impact process.

To make the foregoing objective, features, and advantages of the present invention clearer and more comprehensible, the present invention is further described in detail below with reference to the accompanying drawings and specific embodiments.

Figure 1:
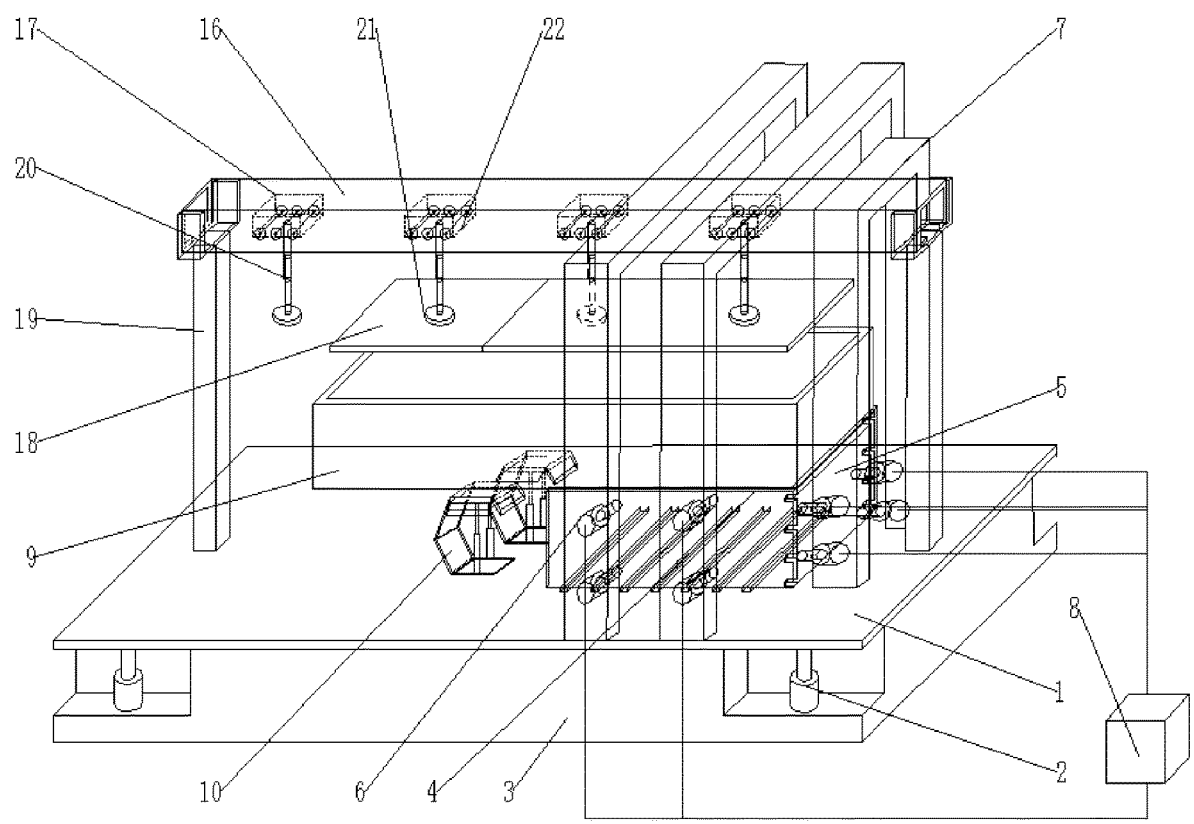
FIG. 1 is a structural schematic diagram of an experimental platform for simulating a coal rock disaster of a coal mine extraction in the present invention.
Figure 2:
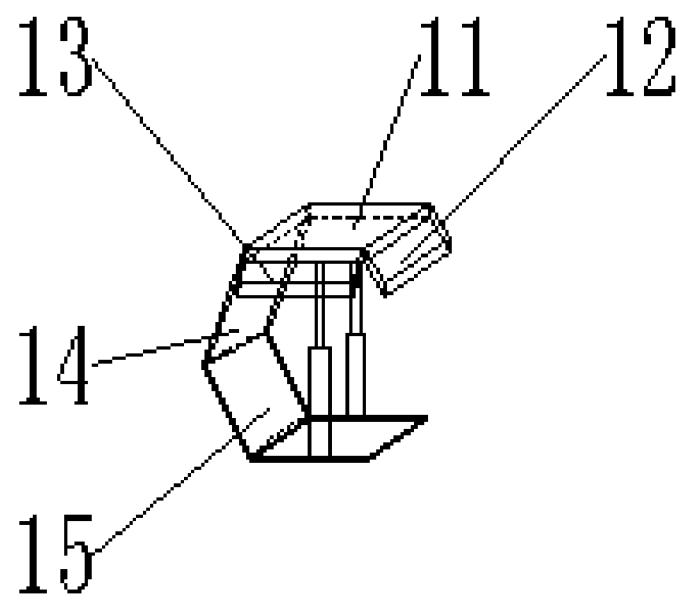
FIG. 2 is a structural schematic diagram of a hydraulic support in the present invention.
Figure 3:
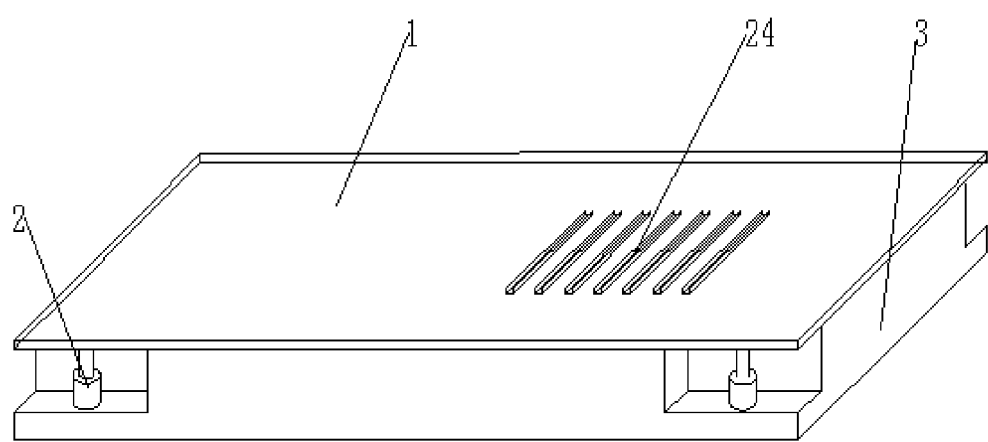
FIG. 3 is a structural schematic diagram of a base device in the present invention.
Figure 4:
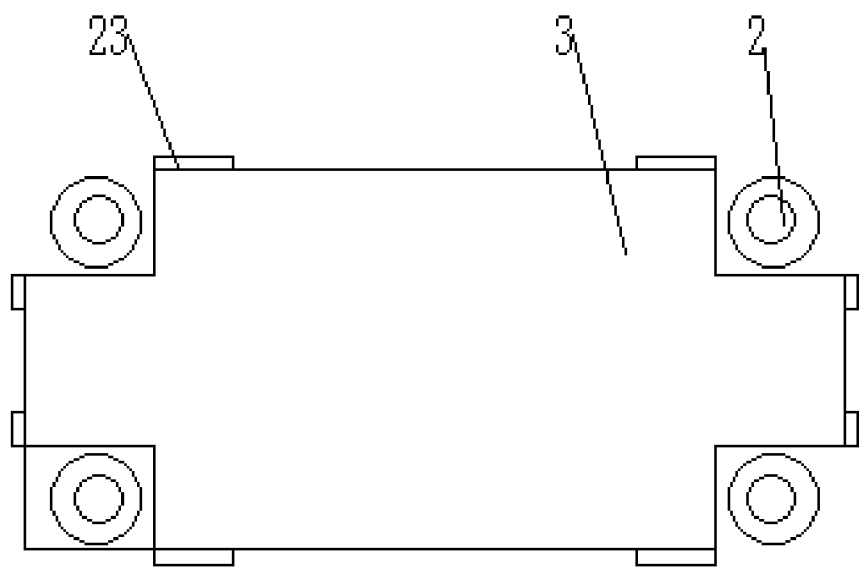
FIG. 4 is a structural schematic diagram of a carrying platform in the present invention.
Figure 5:
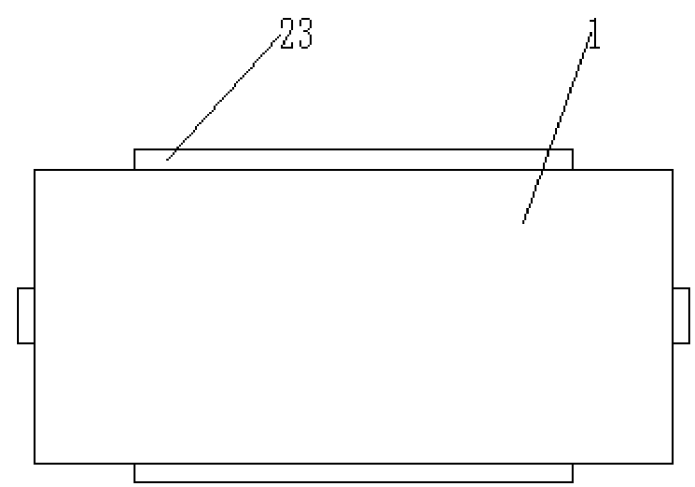
FIG. 5 is a structural schematic diagram of a pedestal in the present invention.
Figure 6:
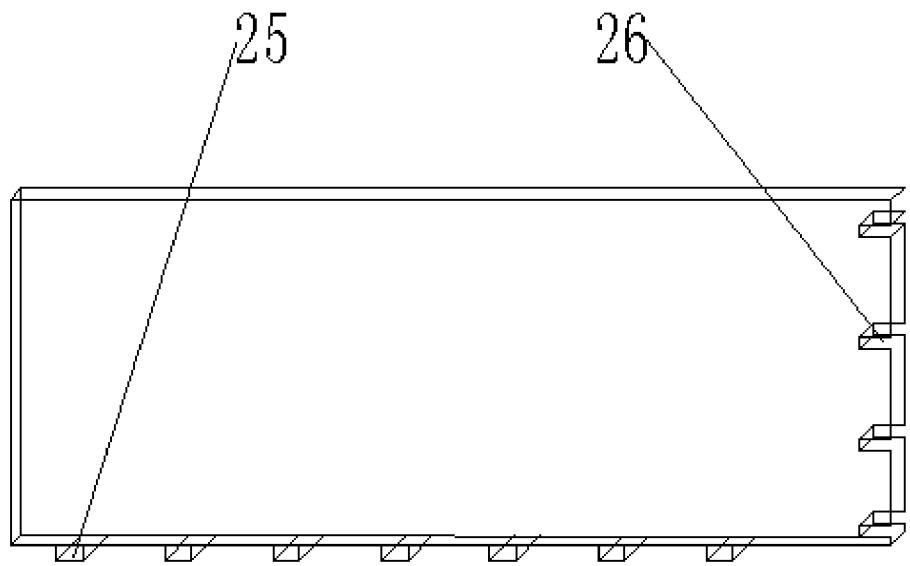
FIG. 6 is a structural schematic diagram of a lateral baffle plate in the present invention.
Figure 7:
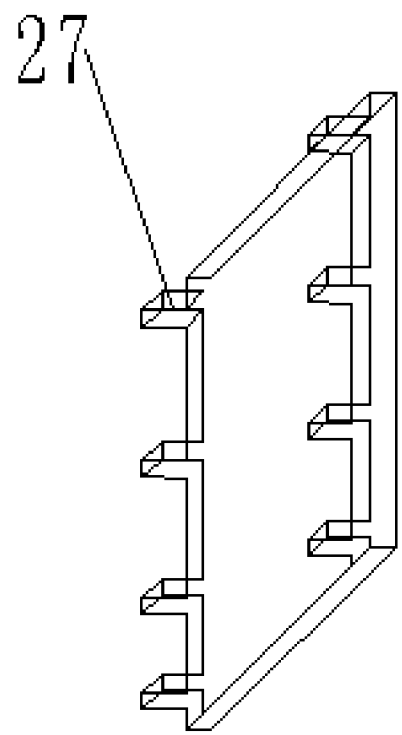
FIG. 7 is a structural schematic diagram of a rear baffle plate in the present invention.

As shown in FIG. 1 to FIG. 7, this embodiment provides an experimental platform for simulating a coal rock disaster of a coal mine extraction, which includes a base device, a coal simulation device, an immediate roof simulation device, a hydraulic support 10 and a removable impact device; the coal simulation device is fixedly disposed on the base device; the coal simulation device is configured to place a coal simulation material; the coal simulation material is proportioned according to coal for simulation; the hydraulic support 10 is fixed on the base device and is located at one side of the coal simulation device; the immediate roof simulation device is disposed above the coal simulation device and the hydraulic support 10; the removable impact device is disposed above the immediate roof simulation device; the immediate roof simulation device is a rectangular frame 9; the rectangular frame 9 may be made of a high-strength and high-rigidity steel plate; a width of the rectangular frame 9 is slightly smaller than a width of the coal simulation material; the rectangular frame 9 is configured to pave a bulk simulation material and an immediate roof simulation material sequentially from the bottom up; and the removable impact device can impact the immediate roof simulation material and the bulk simulation material. A bulk fragment dimension, a fragment dimension grading and a paving thickness of the bulk simulation material may be proportionally selected according to an experimental requirement; and the immediate roof simulation material is proportioned according to a real immediate roof for simulation.

Specifically, the base device includes a carrying platform 3 and a pedestal 1; a slope adjusting jack 2 is disposed between the carrying platform 3 and the pedestal 1; a housing of the slope adjusting jack 2 is fixedly connected to the carrying platform 3; and a push rod of the slope adjusting jack 2 is fixedly connected to the pedestal 1. Both the carrying platform 3 and the pedestal 1 are made of a plate material; a connecting hole 23 is respectively formed at four edges of the carrying platform 3 and the pedestal 1; and the carrying platform 3 is detachably connected to the pedestal 1 via the connecting hole 23 and by using a connecting rod. When an angle of the pedestal 1 needs to be adjusted, connecting rods at other three edges are taken out to adjust an inclination angle of the pedestal 1, thus meeting different experimental requirements.

The coal simulation device includes a lateral baffle plate 4, a front baffle plate, a rear baffle plate 5 and an enclosed pressure application device; the lateral baffle plate 4, the front baffle plate and the rear baffle plate 5 are disposed on the pedestal 1; the lateral baffle plate 4, the front baffle plate and the rear baffle plate 5 are made of a high-strength and high-rigidity steel plate; a plurality of first grooves 24 are formed on the pedestal 1; a plurality of first bumps 25 are disposed on a bottom end of the lateral baffle plate 4; the lateral baffle plate 4 is slidably connected to the pedestal 1 via the first bumps 25 and the first grooves 24; a plurality of second grooves 26 are formed on a rear end of the lateral baffle plate 4; a plurality of second bumps 27 are disposed on the rear baffle plate 5; the rear baffle plate 5 is slidably connected to the lateral baffle plate 4 via the second bumps 27 and the second grooves 26; a front end of the lateral baffle plate 4 is detachably connected to the front baffle plate; and the enclosed pressure application device provides an enclosed pressure for the lateral baffle plate 4 and the rear baffle plate 5. The enclosed pressure application device includes a lateral carrying shaft 7, a pump station 8 and a plurality of hydraulic cylinders 6; the lateral carrying shaft 7 is fixed on the pedestal 1 by welding; the lateral carrying shaft 7 is made of two high-strength and high-rigidity transverse H-shaped steel plates; the two transverse H-shaped steel plates are welded; and cylinder bodies of the hydraulic cylinders 6 are fixed on the lateral carrying shaft 7. In this embodiment, the cylinder bodies of the hydraulic cylinders 6 are selected to be welded on the lateral carrying shaft 7. Push rods of the hydraulic cylinders 6 can contact with the lateral baffle plate 4 and the rear baffle plate 5 respectively; and all hydraulic cylinders 6 communicate with a pump station 8, with an enclosed pressure uniformly provided and controlled by the pump station 8. The slidable connection between the lateral baffle plate 4 and the pedestal 1, as well as between the lateral baffle plate 4 and the rear baffle plate 5 is beneficial for application of the enclosed pressure. A three-directional stress is simulated on two lateral baffle plates 4 and the rear baffle plate 5 respectively via the pump station 8 and the hydraulic cylinders 6 to be more close to an actual condition of the extraction. Preferably, the hydraulic cylinders 6 are welded with the lateral carrying shaft 7, so it is assured that the hydraulic cylinders 6 can apply the pressure stably.

The hydraulic support 10 is made of a high-strength stainless steel; the hydraulic support 10 includes a top beam 11, a shield beam 14, a tail beam 15, a guard plate 12 and a lateral protective plate 13; the top beam 11 and the shield beam 14 are made of a steel plate; an included angle between the top beam 11 and the shield beam 14 is 60°; the tail beam 15 is hinged with the shield beam 14; a rear end of the top beam 11 is hinged with the guard plate 12; one side, adjacent to the guard plate 12, of the top beam 11 is hinged with the lateral protective plate 13; and the guard plate 12 can be attached to the coal simulation material when being opened. The hinged connection may use a mortise and tenon type hinged structure connected via a pin roll. The top beam 11, the guard plate 12 and the lateral protective plate 13 is respectively provided with a stress sensor. According to an experimental requirement, the hydraulic support 10 has a certain setting load and a working resistance of the hydraulic support 10 can be manifested by compressive deformation of the hydraulic support 10, so that a stress change for different parts of the hydraulic support 10 can be monitored.

The removable impact device includes a support rod 19, a track 16 and an electric-lifting electromagnetic absorption device 17; two support rods 19 are provided; the support rods 19 are made of a high-strength and high-rigidity steel plate; bottom ends of the two support rods 19 are fixed on the pedestal 1; the track 16 is crossly fixed on top ends of the two support rods 19; the track 16 is made of a high-rigidity steel material and is fixed above the immediate roof simulation device via the two support rods 19; a scale is provided on an outer surface of the track 16 to facilitate the control of a sliding distance of the electric-lifting electromagnetic absorption device 17 on the track 16; and by moving the electric-lifting electromagnetic absorption device 17, a downward impact position is changed to simulate, at different rupture positions of the immediate roof, a load condition, a coal-wall displacement and a broken condition of different parts of the hydraulic support 10 An upper end of the electric-lifting electromagnetic absorption device 17 is slidably connected to the track 16; a lower end of the electric-lifting electromagnetic absorption device 17 is fixedly connected to an iron plate 18; the iron plate 18 is made of a steel material; and the iron plate 18 can impact the immediate roof simulation material and the bulk simulation material. The top ends of the support rods 19 are of a U-shaped structure respectively; the track 16 is welded in the U-shaped structures of the support rods 19; a top end of the lateral carrying shaft 7 is welded on the track 16; and the rectangular frame 9 is welded on the lateral carrying shaft 7 via an angle steel or angle iron.

At least two electric-lifting electromagnetic absorption devices 17 are provided and are controlled respectively and independently. In this embodiment, four electric-lifting electromagnetic absorption devices 17 are provided. The electric-lifting electromagnetic absorption device 17 includes a steel slide plate 22, an electric lifting shaft 20 and a sucking disc type electromagnet 21. The steel slide plate 22 is slidably connected to the track 16. A plurality of idler wheels are disposed on the steel slide plate 22. In this embodiment, six idler wheels are provided. The idler wheels are moved on the track 16. One end of the electric lifting shaft 20 is fixedly connected to the steel slide plate 22, and the other end of the electric lifting shaft 20 is connected to the sucking disc type electromagnet 21; and sucking disc type electromagnet 21 can absorb or release the iron plate 18. In this embodiment, by moving the electric-lifting electromagnetic absorption device 17 and driving the iron plate 18 to move, the simulation for different rupture positions of the immediate roof is implemented. The sucking disc type electromagnet 21 may be set into different weights. The electric lifting shaft 20 may be moved with the steel slide plate 22, and may further be telescopic freely up and down. By raising or lowering a height of the sucking disc type electromagnet 21, or providing sucking disc type electromagnets 21 having different weights for the iron plate 18, an amplitude of an impact load is changed.

In specific application, for simulation of different rupture angles, one iron plate 18 may further be absorbed by two sucking disc type electromagnets 21, and different high and low positions of two electric lifting shafts 20 are controlled respectively and independently, thereby simulating a rupture condition of an upper roof having the different rupture angles. For simulation of rotating deformation instability and falling deformation instability of the upper roof, a chronological power-off sequence of two sucking disc type electromagnets 21 is controlled to obtain different falling manners of an iron plate 18, thereby simulating a condition of the rotating deformation instability and the falling deformation instability of the upper roof. For simulation of different rupture positions, an electromagnet absorption device 17 is moved and an iron plate 18 is driven to move in a horizontal direction, so that the iron plate 18 is fallen at different horizontal positions to simulate different rupture positions of an immediate roof. For simulation of different impact loads, a height of a sucking disc type electromagnet 21 is risen or lowered, or sucking disc type electromagnets 21 having different weights are provided for an iron plate 18 to simulate the different impact loads. After the iron plate 18 is fallen, an impact force is provided for an immediate roof simulation material in a rectangular frame 9; and meanwhile, a bulk material is paved below the immediate roof simulation material to simulate a buffer effect of loose top-coal or a broken immediate roof. For simulation of roof weighting and an impact ground pressure of a extraction, the roof weighting and the impact ground pressure of the extraction are manifested by a hydraulic support 10 and a coal wall in this embodiment; and through a pressure sensor monitor, a change condition of a stress on different parts of the hydraulic support 10 is recorded to finally obtain different rupture manners, different weighting intensities, different rupture positions, and different rupture sequences of the immediate roof under different exploitation conditions, as well as a load condition, a coal-wall displacement and a broken condition of different parts of the hydraulic support 10 under a condition where the loose top-coal or broken immediate roof is above the coal wall, and data are analyzed and processed.

This embodiment further provides an experimental method for simulating a coal rock disaster of a coal mine extraction, which uses the above experimental platform for simulating a coal rock disaster of a coal mine extraction and includes the following steps:

1) Prepare a coal simulation material according to a proportion of sand, lime and gypsum materials in coal in a coal simulation device.

2) Uniformly arrange a plurality of strain gauges and displacement sensors at a side, close to a lateral baffle plate 4 and a rear baffle plate 5, in the coal simulation material, and place a pressure box below the coal simulation material.

3) Pave a bulk simulation material in a rectangular frame 9 to simulate loose top-coal or a broken immediate roof.

4) Pave an immediate roof simulation material on the bulk simulation material.

5) Respectively absorb a central axis position of an iron plate 18 by using two electric-lifting electromagnetic absorption devices 17.

6) Power off a sucking disc type electromagnet 21, so that two iron plates 18 are thrown down to impact the coal simulation material, thus simulating rupture or an impact ground pressure of a basic roof.

7) Record a change of a stress on a top beam 11, a lateral protective plate 13 and a guard plate 12, as well as a coal-wall displacement and a broken condition.

8) Change a bulk fragment dimension, a fragment dimension grading and a paving thickness of the bulk simulation material, and repeating the steps 4-7.

9) Change a horizontal position, a height, a counterweight and an inclination angle of the iron plate 18 as well as an inclination angle of a pedestal 1, and repeating the steps 5-8.

With the utilization of the steps 1-9, different rupture manners, different weighting intensities, different rupture positions and different rupture sequences of an immediate roof under different exploitation conditions, as well as a load condition, a coal-wall displacement and a rupture condition of different parts of a hydraulic support 10 under a condition where different loose top-coal or broken immediate roofs are above a coal wall are simulated, and monitored data is recorded. A support load of a extraction, a condition of a working surface, and a relationship between the loose top-coal or the broken immediate roof and coal-wall deformation of the coal mine extraction are analyzed by using the monitored data; and therefore, a corresponding measure may be taken timely according to a working condition of a device on the working surface to achieve effects of effectively preventing, treating and reducing a extraction disaster and to provide a guarantee for safety exploitation of the working surface.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. An experimental platform for simulating a coal rock disaster of a coal mine extraction, comprising a base device, a coal simulation device, an immediate roof simulation device, a hydraulic support and a removable impact device, wherein:

the base device comprises a carrying platform and a pedestal;

a slope adjusting jack is disposed between the carrying platform and the pedestal;

a housing of the slope adjusting Jack is fixedly connected to the carrying platform;
a push rod of the slope adjusting Jack is fixedly connected to the pedestal;
the coal simulation device is fixedly disposed on the base device, and the coal simulation device comprises two lateral baffle plates, a front baffle plate, a rear baffle plate and an enclosed pressure application device, wherein:
the two lateral baffle plates, the front baffle plate and the rear baffle plate are disposed on the pedestal;
a plurality of first grooves is formed on the pedestal;
a plurality of first bumps is disposed on a bottom end of each of the two lateral baffle plates;
the two lateral baffle plates are each slidably connected to the pedestal via the first bumps and the first grooves;
a plurality of second grooves is formed on a rear end of each of the two lateral baffle plates;
a plurality of second bumps is disposed on the rear baffle plate;
the rear baffle plate is slidably connected to the two lateral baffle plates via the second bumps and the second grooves;
a front end of each of the two lateral baffle plates is detachably connected to the front baffle plate; and
the enclosed pressure application device provides an enclosed pressure for the two lateral baffle plates and the rear baffle plate;
a coal simulation material is placed on the pedestal and is close to the two lateral baffle plates and the rear baffle plate;
the two lateral baffle plates and the rear baffle plate are configured to simulate three-directional stress of the coal simulation material under the enclosed pressure of the enclosed pressure application device;
the hydraulic support is fixed on the base device and is located at one side of the coal simulation device; the immediate roof simulation device is disposed above the coal simulation device and the hydraulic support;
the removable impact device is disposed above the immediate roof simulation device;
the immediate roof simulation device is a rectangular frame;
the rectangular frame is configured to pave a bulk simulation material and an immediate roof simulation material sequentially from the bottom up; and
the removable impact device can impact the immediate roof simulation material and the bulk simulation material.

2. The experimental platform for simulating a coal rock disaster of a coal mine extraction according to claim 1, wherein both the carrying platform and the pedestal are made of a plate material; a connecting hole is respectively formed at four edges of the carrying platform and the pedestal; and the carrying platform is detachably connected to the pedestal via the connecting hole and by using a connecting rod.

3. The experimental platform for simulating a coal rock disaster of a coal mine extraction according to claim 1, wherein the enclosed pressure application device comprises a lateral carrying shaft, a pump station and a plurality of hydraulic cylinders; the lateral carrying shaft is fixed on the pedestal; cylinder bodies of the hydraulic cylinders are fixed on the lateral carrying shaft; push rods of the hydraulic cylinders can contact with the lateral baffle plate and the rear baffle plate respectively; and the hydraulic cylinders communicates with the pump station.

4. The experimental platform for simulating a coal rock disaster of a coal mine extraction according to claim 1, wherein the hydraulic support comprises a top beam, a shield beam, a tail beam, a guard plate and a lateral protective plate; the top beam and the shield beam are made of a steel plate; an included angle between the top beam and the shield beam is 60°; the tail beam is hinged with the shield beam; a rear end of the top beam is hinged with the guard plate;
one side, adjacent to the guard plate, of the top beam is hinged with the lateral protective plate; the guard plate can be attached to the coal simulation material when being opened; and the top beam, the guard plate and the lateral protective plate is respectively provided with a stress sensor.

5. The experimental platform for simulating a coal rock disaster of a coal mine extraction according to claim 3, wherein the removable impact device comprises a support rod, a track and an electric-lifting electromagnetic absorption device; two support rods are provided;
bottom ends of the two support rods are fixed on the pedestal; the track is crossly fixed on top ends of the two support rods; an upper end of the electric-lifting electromagnetic absorption device is slidably connected to the track; a lower end of the electric-lifting electromagnetic absorption device is fixedly connected to an iron plate; and the iron plate can impact the immediate roof simulation material and the bulk simulation material.

6. The experimental platform for simulating a coal rock disaster of a coal mine extraction according to claim 5, wherein the top ends of the support rods are of a U-shaped structure respectively; the track is welded in the U-shaped structures of the support rods; a top end of the lateral carrying shaft is welded on the track; and the rectangular frame is welded on the lateral carrying shaft.

7. The experimental platform for simulating a coal rock disaster of a coal mine extraction according to claim 5, wherein at least two electric-lifting electromagnetic absorption devices are provided and are controlled respectively and independently; the electric-lifting electromagnetic absorption device comprises a steel slide plate, an electric lifting shaft and a sucking disc type electromagnet; the steel slide plate is slidably connected to the track; a plurality of idler wheels are disposed on the steel slide plate; the idler wheels are moved on the track; one end of the electric lifting shaft is fixedly connected to the steel slide plate, and the other end of the electric lifting shaft is connected to the sucking disc type electromagnet; and sucking disc type electromagnet can absorb or release the iron plate.

8. An experimental method for simulating a coal rock disaster of a coal mine extraction, using the experimental platform for simulating a coal rock disaster of a coal mine extraction according to claim 1 and comprising the following steps:
1) preparing a coal simulation material according to a proportion of sand, lime and gypsum materials in coal in the coal simulation device;
2) uniformly arranging the plurality of strain gauges and displacement sensors at a side, close to a lateral baffle plate and a rear baffle plate, in the coal simulation material, and placing a pressure box below the coal simulation material;
3) paving a bulk simulation material in a rectangular frame to simulate loose top-coal or a broken immediate roof;

4) paving an immediate roof simulation material on the bulk simulation material;
5) respectively absorbing a central axis position of an iron plate by using two electric-lifting electromagnetic absorption devices;
6) powering off a sucking disc type electromagnet, so that two iron plates are thrown down to impact the coal simulation material, thus simulating rupture or an impact ground pressure of a basic roof;
7) recording a change of a stress on a top beam, a lateral protective plate and a guard plate, as well as a coal-wall displacement and a broken condition;
8) changing a bulk fragment dimension, a fragment dimension grading and a paving thickness of the bulk simulation material, and repeating the steps 4-7; and
9) changing a horizontal position, a height, a counterweight and an inclination angle of the iron plate as well as an inclination angle of a pedestal, and repeating the steps 5-8.

9. An experimental method for simulating a coal rock disaster of a coal mine extraction, using the experimental platform for simulating a coal rock disaster of a coal mine extraction according to claim 2 and comprising the following steps:
1) preparing the coal simulation material according to a proportion of sand, lime and gypsum materials in coal in the coal simulation device;
2) uniformly arranging a plurality of strain gauges and displacement sensors at a side, close to a lateral baffle plate and a rear baffle plate, in the coal simulation material, and placing a pressure box below the coal simulation material;
3) paving a bulk simulation material in a rectangular frame to simulate loose top-coal or a broken immediate roof;
4) paving an immediate roof simulation material on the bulk simulation material;
5) respectively absorbing a central axis position of an iron plate by using two electric-lifting electromagnetic absorption devices;
6) powering off a sucking disc type electromagnet, so that two iron plates are thrown down to impact the coal simulation material, thus simulating rupture or an impact ground pressure of a basic roof;
7) recording a change of a stress on a top beam, a lateral protective plate and a guard plate, as well as a coal-wall displacement and a broken condition;
8) changing a bulk fragment dimension, a fragment dimension grading and a paving thickness of the bulk simulation material, and repeating the steps 4-7; and
9) changing a horizontal position, a height, a counterweight and an inclination angle of the iron plate as well as an inclination angle of a pedestal, and repeating the steps 5-8.

10. An experimental method for simulating a coal rock disaster of a coal mine extraction, using the experimental platform for simulating a coal rock disaster of a coal mine extraction according to claim 3 and comprising the following steps:
1) preparing the coal simulation material according to a proportion of sand, lime and gypsum materials in coal in the coal simulation device;
2) uniformly arranging a plurality of strain gauges and displacement sensors at a side, close to a lateral baffle plate and a rear baffle plate, in the coal simulation material, and placing a pressure box below the coal simulation material;
3) paving a bulk simulation material in a rectangular frame to simulate loose top-coal or a broken immediate roof;
4) paving an immediate roof simulation material on the bulk simulation material;
5) respectively absorbing a central axis position of an iron plate by using two electric-lifting electromagnetic absorption devices;
6) powering off a sucking disc type electromagnet, so that two iron plates are thrown down to impact the coal simulation material, thus simulating rupture or an impact ground pressure of a basic roof;
7) recording a change of a stress on a top beam, a lateral protective plate and a guard plate, as well as a coal-wall displacement and a broken condition;
8) changing a bulk fragment dimension, a fragment dimension grading and a paving thickness of the bulk simulation material, and repeating the steps 4-7; and
9) changing a horizontal position, a height, a counterweight and an inclination angle of the iron plate as well as an inclination angle of a pedestal, and repeating the steps 5-8.

11. An experimental method for simulating a coal rock disaster of a coal mine extraction, using the experimental platform for simulating a coal rock disaster of a coal mine extraction according to claim 4 and comprising the following steps:
1) preparing the coal simulation material according to a proportion of sand, lime and gypsum materials in coal in the coal simulation device;
2) uniformly arranging a plurality of strain gauges and displacement sensors at a side, close to a lateral baffle plate and a rear baffle plate, in the coal simulation material, and placing a pressure box below the coal simulation material;
3) paving a bulk simulation material in a rectangular frame to simulate loose top-coal or a broken immediate roof;
4) paving an immediate roof simulation material on the bulk simulation material;
5) respectively absorbing a central axis position of an iron plate by using two electric-lifting electromagnetic absorption devices;
6) powering off a sucking disc type electromagnet, so that two iron plates are thrown down to impact the coal simulation material, thus simulating rupture or an impact ground pressure of a basic roof;
7) recording a change of a stress on a top beam, a lateral protective plate and a guard plate, as well as a coal-wall displacement and a broken condition;
8) changing a bulk fragment dimension, a fragment dimension grading and a paving thickness of the bulk simulation material, and repeating the steps 4-7; and
9) changing a horizontal position, a height, a counterweight and an inclination angle of the iron plate as well as an inclination angle of a pedestal, and repeating the steps 5-8.

12. An experimental method for simulating a coal rock disaster of a coal mine extraction, using the experimental platform for simulating a coal rock disaster of a coal mine extraction according to claim 5 and comprising the following steps:
1) preparing the coal simulation material according to a proportion of sand, lime and gypsum materials in coal in the coal simulation device;
2) uniformly arranging a plurality of strain gauges and displacement sensors at a side, close to a lateral baffle plate and a rear baffle plate, in the coal simulation material, and placing a pressure box below the coal simulation material;

3) paving a bulk simulation material in a rectangular frame to simulate loose top-coal or a broken immediate roof;

4) paving an immediate roof simulation material on the bulk simulation material;

5) respectively absorbing a central axis position of an iron plate by using two electric-lifting electromagnetic absorption devices;

6) powering off a sucking disc type electromagnet, so that two iron plates are thrown down to impact the coal simulation material, thus simulating rupture or an impact ground pressure of a basic roof;

7) recording a change of a stress on a top beam, a lateral protective plate and a guard plate, as well as a coal-wall displacement and a broken condition;

8) changing a bulk fragment dimension, a fragment dimension grading and a paving thickness of the bulk simulation material, and repeating the steps 4-7; and 9) changing a horizontal position, a height, a counterweight and an inclination angle of the iron plate as well as an inclination angle of a pedestal, and repeating the steps 5-8.

13. An experimental method for simulating a coal rock disaster of a coal mine extraction, using the experimental platform for simulating a coal rock disaster of a coal mine extraction according to claim 6 and comprising the following steps:

1) preparing the coal simulation material according to a proportion of sand, lime and gypsum materials in coal in the coal simulation device;

2) uniformly arranging a plurality of strain gauges and displacement sensors at a side, close to a lateral baffle plate and a rear baffle plate, in the coal simulation material, and placing a pressure box below the coal simulation material;

3) paving a bulk simulation material in a rectangular frame to simulate loose top-coal or a broken immediate roof;

4) paving an immediate roof simulation material on the bulk simulation material;

5) respectively absorbing a central axis position of an iron plate by using two electric-lifting electromagnetic absorption devices;

6) powering off a sucking disc type electromagnet, so that two iron plates are thrown down to impact the coal simulation material, thus simulating rupture or an impact ground pressure of a basic roof;

7) recording a change of a stress on a top beam, a lateral protective plate and a guard plate, as well as a coal-wall displacement and a broken condition;

8) changing a bulk fragment dimension, a fragment dimension grading and a paving thickness of the bulk simulation material, and repeating the steps 4-7; and 9) changing a horizontal position, a height, a counterweight and an inclination angle of the iron plate as well as an inclination angle of a pedestal, and repeating the steps 5-8.

14. An experimental method for simulating a coal rock disaster of a coal mine extraction, using the experimental platform for simulating a coal rock disaster of a coal mine extraction according to claim 7 and comprising the following steps:

1) preparing the coal simulation material according to a proportion of sand, lime and gypsum materials in coal in the coal simulation device;

2) uniformly arranging a plurality of strain gauges and displacement sensors at a side, close to a lateral baffle plate and a rear baffle plate, in the coal simulation material, and placing a pressure box below the coal simulation material;

3) paving a bulk simulation material in a rectangular frame to simulate loose top-coal or a broken immediate roof;

4) paving an immediate roof simulation material on the bulk simulation material;

5) respectively absorbing a central axis position of an iron plate by using two electric-lifting electromagnetic absorption devices;

6) powering off a sucking disc type electromagnet, so that two iron plates are thrown down to impact the coal simulation material, thus simulating rupture or an impact ground pressure of a basic roof;

7) recording a change of a stress on a top beam, a lateral protective plate and a guard plate, as well as a coal-wall displacement and a broken condition;

8) changing a bulk fragment dimension, a fragment dimension grading and a paving thickness of the bulk simulation material, and repeating the steps 4-7; and 9) changing a horizontal position, a height, a counterweight and an inclination angle of the iron plate as well as an inclination angle of a pedestal, and repeating the steps 5-8.

* * * * *